US008180330B2

(12) United States Patent
Blicker

(10) Patent No.: US 8,180,330 B2
(45) Date of Patent: May 15, 2012

(54) METHOD FOR COLLECTING USER BEHAVIOR DURING RUN-TIME IN A MOBILE 3GPP IP-BASED MULTIMEDIA SUBSYSTEM (IMS)

(75) Inventor: Stephan Blicker, Wachtberg-Villip. (DE)

(73) Assignee: T-Mobile International AG & Co. KG, Bonn (DE)

( * ) Notice: Subject to any disclaimer, the term of this patent is extended or adjusted under 35 U.S.C. 154(b) by 940 days.

(21) Appl. No.: 11/997,456

(22) PCT Filed: Aug. 1, 2006

(86) PCT No.: PCT/EP2006/007600
§ 371 (c)(1),
(2), (4) Date: May 27, 2008

(87) PCT Pub. No.: WO2007/014751
PCT Pub. Date: Feb. 8, 2007

(65) Prior Publication Data
US 2008/0274720 A1    Nov. 6, 2008

(30) Foreign Application Priority Data

Aug. 4, 2005   (DE) .................. 10 2005 037 314
Nov. 29, 2005  (DE) .................. 10 2005 057 236

(51) Int. Cl.
*H04M 3/42*    (2006.01)
*H04M 1/725*   (2006.01)
*H04W 40/00*   (2009.01)

(52) U.S. Cl. .................. 455/414.1; 455/412.1; 455/445

(58) Field of Classification Search ............... 455/414.1, 455/412.1, 445
See application file for complete search history.

(56) References Cited

U.S. PATENT DOCUMENTS

| 7,738,465 | B2 * | 6/2010 | Akahane et al. | 370/395.3 |
| 2002/0181424 | A1 * | 12/2002 | Shaheen et al. | 370/338 |
| 2003/0012150 | A1 * | 1/2003 | Chapuran et al. | 370/271 |
| 2003/0040280 | A1 | 2/2003 | Koskelainen | |
| 2003/0076813 | A1 * | 4/2003 | Isomaki | 370/352 |
| 2003/0115332 | A1 * | 6/2003 | Honeisen | 709/227 |
| 2004/0121775 | A1 * | 6/2004 | Ropolyi et al. | 455/445 |
| 2006/0025140 | A1 * | 2/2006 | Bales et al. | 455/445 |
| 2006/0092970 | A1 * | 5/2006 | Song et al. | 370/466 |
| 2007/0159976 | A1 * | 7/2007 | Dekeyzer et al. | 370/236 |

FOREIGN PATENT DOCUMENTS

| EP | 1 551 144 | 7/2005 |
| WO | 02/098099 | 12/2002 |

OTHER PUBLICATIONS

Raty, Tomi et al., "Network traffic analyzing and monitoring system locations in the IP Multimedia Subsystem", 31st EUROMICRO Conference on Software Engineering and Advanced Application, Jan. 2005.

* cited by examiner

*Primary Examiner* — Christopher M Brandt
(74) *Attorney, Agent, or Firm* — Faegre Baker Daniels LLP

(57) ABSTRACT

The invention relates to a method and an arrangement for collecting user behavior during run-time in a mobile 3GPP IP-based multimedia subsystem (IMS). According to the invention, a collection of statistical data in communications systems ensues, and the user behavior is evaluated during the run-time of the application.

13 Claims, 3 Drawing Sheets

METHOD FOR COLLECTING USER BEHAVIOR DURING RUN-TIME IN A MOBILE 3GPP IP-BASED MULTIMEDIA SUBSYSTEM (IMS)

CROSS-REFERENCE TO RELATED APPLICATION

This application is related to and claims the benefit under 35 U.S.C. §119 and 35 U.S.C. §365 of International Application No. PCT/EP2006/007600, filed Aug. 1, 2006.

The invention relates to a method and an arrangement for collecting user behavior during run-time in a mobile 3GPP IP based multimedia subsystem (IMS).

Contemporary statistical systems in mobile communication systems are mostly based on an evaluation of connection data, so-called Call Data Records, CDR. The connection data are usually generated after a voice connection. Because of the evaluation of the connection data important conclusions can be drawn concerning the user behavior of the respective communication subscriber who identifies himself in the mobile system by his MSISDN and IMSI. The subscriber (customer) can, dependent on the user behavior, be supplied individually, e.g. via mail, with information and can be informed about, for example, certain aspects, e.g., fees, etc.

Presently the statistics of IMS or SIP based services are collected by that the connection data are evaluated by special collection functions. The CDRs are fetched from the fee collection functions by means of, for example, the FTP (File Transfer Protocol). The CDRs are then evaluated offline in the IT and Data Warehouse Systems of the provider or network operator. The results are interpreted and conclusions with respect to the service dependent user behavior can be drawn. A series of measures of the network operator or service provider follows these conclusions, for example, the creation of leaflets (flyers), advertisement in mailings, and others.

Until now the methods for the collecting of statistics and for the collecting of user behavior are slow so that it is not possible to react currently to the user behavior. It is therefore the task of the invention to specify an improved method and system for the collecting of user behavior during run-time in mobile IMS communication networks.

This task is according to the invention accomplished by the characteristics of the independent claims whose content is here referred to.

Preferred embodiments of the invention are specified in the dependent claims whose content is here referred to.

The method according to the invention for collecting user behavior during run-time in the mobile 3GPP IP based multimedia subsystem (IMS) makes it possible to transmit user behavior dependent information to the mobile terminal device, for example, in the form of advertisement, ring tones, images, and clips. The method is based on a new technical component OSAS (Online Statistics and Advertisement Server) that is integrated as an application server into the IMS. With the OSAS system, statistical data for IP based services can be collected and evaluated during run-time, so that at run-time, thus during the establishment of the connection, a subscriber can be supplied already with relevant information. This information can be delivered in different (multimedia) media, e.g., images, text, music, and video.

The Online Statistics and Advertisement Server (OSAS)

The Online Statistics and Advertisement Server, OSAS, is a new application server component that is bundled in the IMS session applications and in the corresponding signaling traffic. In comparison to the CDR based statistics, as described in the introduction, the OSAS has the following important advantages:

The possibility of online evaluation of the user behavior during the run-time of the application, in quasi real time. The results can be looked at online and not offline as in the case of the evaluation of the CDRs that is connected with a delay of at least several hours.

Online advertisement and information of the subscriber is possible, during the connection setup and during the connection, dependent on the statistical data that are collected about the user.
for example, fee alternatives can be announced.
for example, new services can be requested
for example, media can be transmitted during the connection setup The possibility to evaluate user data and subscriber behavior during the connection setup even makes it possible to offer the Option IMS services, similar known GSM services such as, for example, the TMO Soundlogo service, at the IMS level using MIME types during the session setup such as
images [jpg, tiff, gif, . . . ]
text [ASCII, UFT8, . . . ]
music [wav, mpeg, . . . such as in the case of the Soundlogo service]

The concept to use redirect mechanisms to collect user dependent data is well known in the Internet and http communities (so-called Adserver redirects). A verification of the concept should therefore be easily made available for IMS based services.

Applications

Many applications can be derived by using IMS based services and online collection of statistics and by making available online advertisement and other information, for example:
Connection setup to the Push to Talk Server for outgoing mobile traffic
Connection setup to the Push to Talk Server for incoming mobile traffic
Connection setup for video telephony for outgoing mobile traffic
Connection setup for video telephony for incoming mobile traffic
Connection setup for the combined Push to Talk and presence services for outgoing mobile traffic.

The invention is in the following described in greater detail with the aid of the drawings.

ARCHITECTURE AND PREREQUISITES

Figure 1:
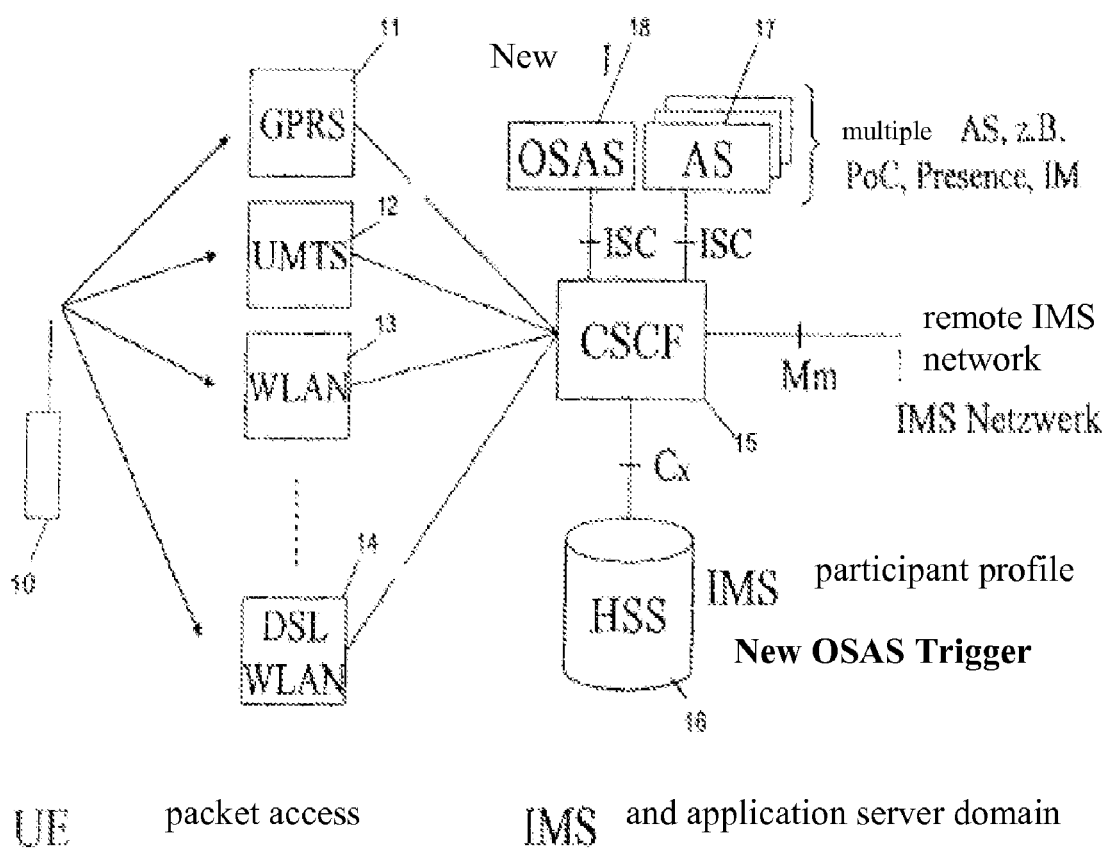
FIG. 1 shows as an example an IMS architecture with the Online Statistics and Advertisement Server (OSAS).

FIG. 1 shows a schematic representation of an IMS architecture that has, in a known manner, three main component layers. At the top is the application layer which supports the most different Application Server,
AS, e.g., a PoC application server 17, in voice and non-voice networks. Subscribers who want to activate or deactivate a service reach the application server by means of their terminal device 10 via a Web portal of their respective communication network such as, e.g., GPRS 11, UMTS 12, WLAN 13, DSL 14, etc. The second layer contains the so-called Call Session Control Function, CSCF, 15 for the registration of the network endpoints and for the routing of SIP signaling to the respective application server 17 and remote IMS network. The components of the first as well as the second layer use a Home Subscriber Server, HSS, 16 which is a higher level resource for the determination of the appropriate service. The HSS 16 runs the individual customer service profiles with constituents such as IP address, roaming information, mailing lists and reserved call and voicemail services. The transport and endpoint layers finally take over the session setup via SIP signaling and carrier services such as the packetizing of speech. This layer has media gateways at its disposal for the conversion from VoIP to TDM. For functions such as conferencing and speech recognition, used in the most different applications including voicemail and interactive VXML, a pool of media servers is available. An Online Statistics and Advertisement Server, OSAS, 18 is according to the invention provided which is in the same way as the application server 17 connected to the CSCF 15.

The architecture according to the invention is based on the IMS architecture as is standardized for the 3GPP UMTS release 5 and higher, e.g., in "Digital Cellular Telecommunications System (phase 2+)"; Universal Mobile Telecommunications System (UMTS); IP Multimedia Subsystem (IMS); stage 2 (3GPP TS 23.228 version 6.8.0 release 6). This specification is in its entirety included in the present description.

Figure 2:
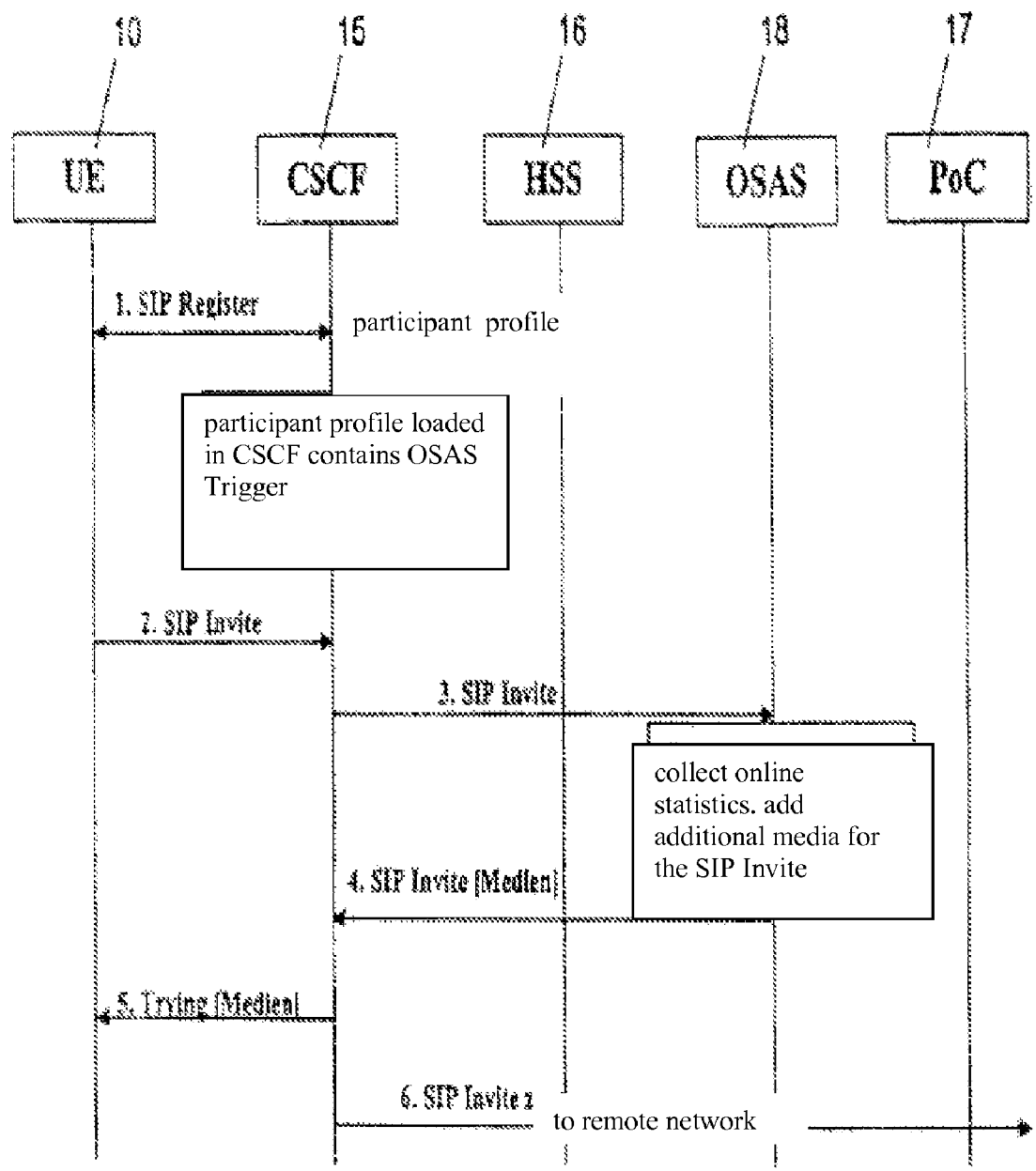
FIG. 2 shows the course of a connection setup for an outgoing mobile conversation for, for example, video telephony subject to the OSAS.

The IMS subscriber profile, that is in the HSS 16 available, contains new trigger points for special application servers, in particular the OSAS 18. The OSAS 18 is included as a new application in the message flow (spiraling flow) of the IMS. The OSAS 18 has access to all of the relevant SIP signaling and to the signaling data during the session setup. The OSAS can from it determine and evaluate all parameters that are relevant for the collection of the user behavior, namely from:

FROM and TO address fields
A Party
B party
used service
used codecs—session duration
for the billing of relevant inter-operator parameters such as IOI
in principal all information in the corresponding SIP messages (e.g., SIP invite)
many other SIP and SDP parameters Examples of High Level Conversation Flow a) FIG. 2 shows the connection setup of an outgoing mobile conversation for, for example, video telephony.

1. SIP Register
The mobile terminal device 10 sends an SIP register message for registering in the Call State Control Function, CSCF, 15. After the successful authentication procedure (here not shown) the subscriber profile from the HSS 16 is loaded into the CSCF 15. It contains a special OSAS trigger with which the OSAS functions are invoked.

2. SIP INVITE (SIP Part, SDP Part)
The mobile terminal device 10 sends a SIP INVITE message to the Call State Control Function 15 in order to initiate an SIP session (e.g., for video telephony). The SIP Invite message is acknowledged by the CSCF 15. The OSAS trigger is likewise acknowledged and takes care of the forwarding of the message to the OSAS 18.

3. SIP Invite (SIP Part, SDP Part)
The OSAS 18 can remove from the forwarded SIP INVITE message online statistical data from the SIP and the SDP part of the message. In addition, it can add media to the SIP Invite.

4. SIP Invite (SIP Part, SDP Part+Additional Media)
The SIP Invite message is now sent back by the OSAS 18 to the CSCF 15. The message can contain additional media that are added-in by the OSAS 18.

5. Trying (Provisional Response+Additional Media Content)
A "Provisional Response" is sent by the SCSF 15 to the mobile terminal device 10. It contains the by the OSAS 18 added additional media such as text advertisement, music, (similar to Soundlogos, ring tones), images, or any other media according to the IETF MIME types.

Figure 3:
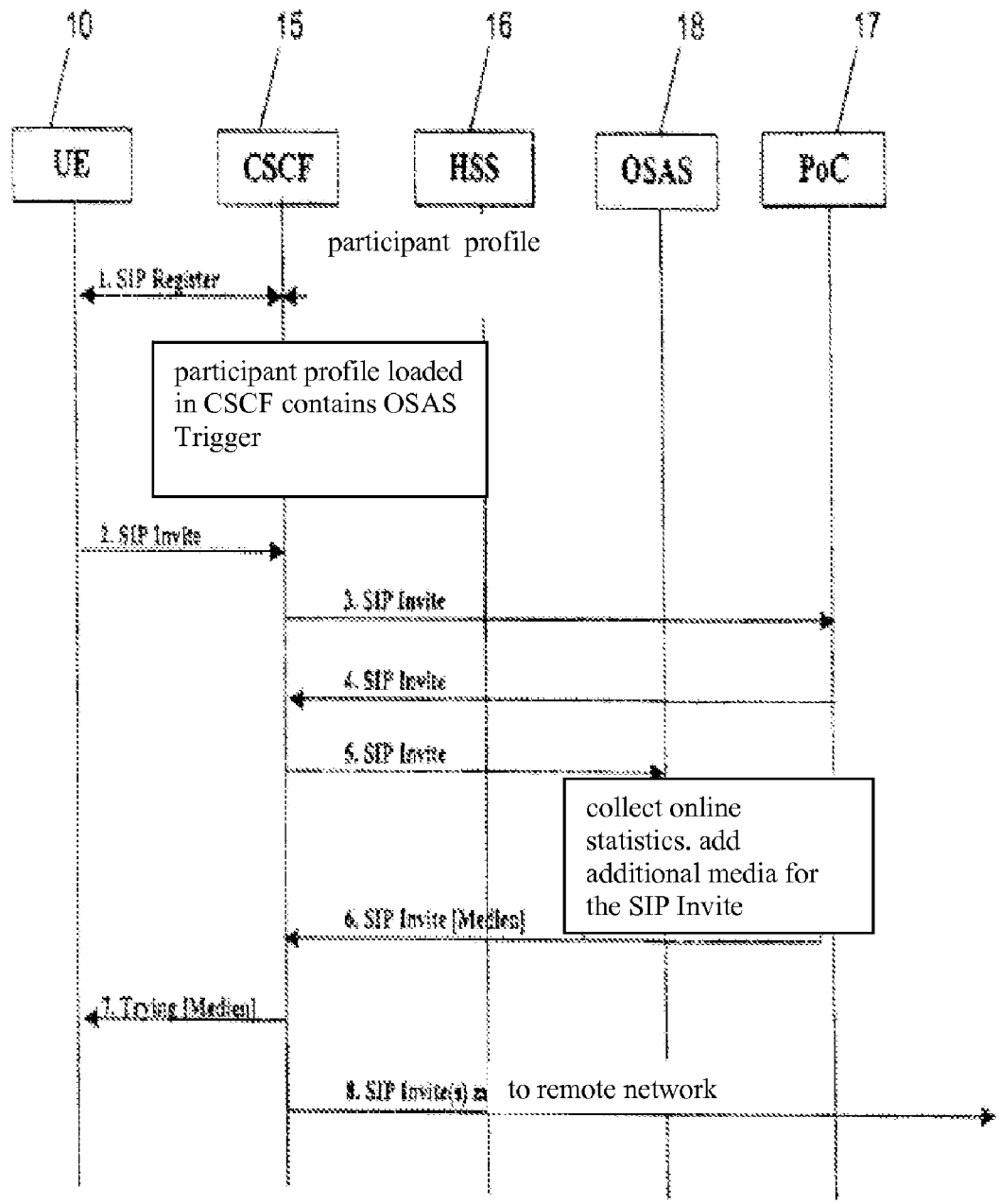
FIG. 3 shows the basic course of the establishment of a connection from Push to Talk subject to the OSAS.

6. SIP Invite (SIP Part, SDP Part)
The SIP Invite as well as the connection setup is forwarded to a remote network without the additional media. The CSCF 15 erases the additional media that originate from the OSAS 18, for example, dependent on the guidelines of the network operator or provider.

b) FIG. 3 shows the basic cell telephone conversation setup for Push to Talk.

1. SIP Register
The mobile terminal device 10 sends an SIP register message for registering in the Call State Control Function, CSCF, 15. After the successful authentication (here not shown) the subscriber profile from the HSS 16 is loaded into the CSCF 15. It contains a PoC trigger and a specific OSAS trigger.

2. SIP Invite (SIP Part, SDP Part)
3. SIP Invite (SIP Part, SDP Part)
The mobile terminal device 10 sends an SIP message to the CSCF 16 in order to establish a PoC connection. The SIP Invite message is acknowledged at the CSCF 15. The CSCF 15 makes the PoC trigger available and forwards the request to a PoC application server 17.

4. SIP Invite (SIP Part, SDP Part, PoC Specific Information)
The PoC server 17 sends the Invite message back to the CSCF 15 and supplies additional PoC specific information.

5. SIP Invite (SIP Part, SDP Part)
The SIP Invite message is again acknowledged at the CSCF 15. The OSAS trigger takes care of the forwarding of the Invite message to the OSAS 18.

6. SIP Invite (SIP Part, SDP Part+Additional Media)
The OSAS 18 can remove online statistics from the SIP and SDP part and, in addition, it can add media to the SIP Invite message and send it back to the CSCF 15.

7. Trying (Provisional Response+Additional Media)
A "provisional response" is sent by the CSCF 15 to the terminal device 10. It contains the by the OSAS 18 added additional media such as, e.g., text advertisement, music, (such as, e.g., Soundlogos, ring tones, images, or any other media) according to the IETF MIME types.

8. SIP Invite (SIP Part, SDP Part)
The SIP message is forwarded to a remote network and does not contain the additional media content. The CSCF 15 takes care of erasing the additional, by the OSAS 18 supplied, media content, for example, dependent on the network operator specifications.

The OSAS 18 provides the means to collect very fast online statistical data so that these can be evaluated by mobile network operators. The OSAS 18 provides means to include media data in the signal flow during the connection setup so that these are played on the terminal device 10 of the user, e.g., dial tones, advertisement images, advertisement text, etc., according to the IETF MIME types.

The concept of the OSAS is known in the Internet community and there HTTP redirect is in fact used for advertisement purposes. The OSAS is capable of dynamically influencing the end user as it evaluates online statistical data with respect

ABBREVIATIONS

| | |
|---|---|
| AS | Application Server |
| CDR | Call Detailed Record |
| CSCF | Call State Control Function |
| HSS | Home Subscriber Server |
| OSAS | Online Statistics and Advertisement server |
| PoC | Push to Talk over Cellular |
| SDP | Session Description Protocol |
| SIP | Session Initiation Protocol |

The invention claimed is:

1. A method for collecting of statistical data of IMS or Session Initiation Protocol (SIP) based services in a mobile Internet Protocol (IP) based multimedia subsystem, IMS, whereby an evaluation of the service dependent user behavior of communication participants during a connection setup initiated by a mobile communication terminal device of a subscriber is carried out with an application, comprising: providing an Online Statistics and Advertisement Server, OSAS, integrated as a new application server component into IMS session applications and the corresponding signaling traffic; wherein the OSAS has access to all of the relevant SIP signaling and to the signaling data during the session setup and can determine from it online all relevant parameters; the OSAS collecting during connection setup run-time online statistical data for IP based services and, during the establishment of said connection, transmitting information to the mobile communication terminal device of the subscriber as a function of the collected online statistical data;

said method including the following steps:
loading a subscriber profile into a Call Session Control Function (CSCF) containing an OSAS trigger that invokes OSAS functions;
the mobile communication terminal device sending an SIP INVITE message to the CSCF to initiate an SIP INVITE session;
the CSCF forwarding the SIP INVITE message to the OSAS, and the OSAS trigger invoking at least one OSAS function;
the OSAS removing from the forwarded SIP INVITE message online statistical data and adding media to the SIP INVITE message and then sending the SIP INVITE message containing the added media back to the CSCF; and
the CSCF sending to the mobile communication terminal device a provisional response containing the OSAS added media.

2. The method according to claim 1, wherein the relevant parameters comprise one or more of the following variables:
FROM and TO address fields
A Party
B party
used service
used codecs
session duration
information for the billing of relevant inter-operator parameters
all information in the corresponding SIP messages
SIP and SDP parameters.

3. A system for collecting statistical data of IMS or SIP based services in a mobile IP multimedia subsystem including means for the execution of the method according to claim 2.

4. A method for the collecting of statistical data of IMS or Session Initiation Protocol (SIP) based services in a mobile Internet Protocol (IP) based multimedia subsystem, IMS, whereby an evaluation of the service dependent user behavior of communication participants during a connection setup initiated by a mobile communication terminal device of a subscriber is carried out with an application, comprising: providing an Online Statistics and Advertisement Server, OSAS, integrated as a new application server component into IMS session applications and the corresponding signaling traffic; wherein the OSAS has access to all of the relevant SIP signaling and to the signaling data during the session setup and can determine from it online all relevant parameters; the OSAS collecting during connection setup run-time online statistical data for IP based services and, during the establishment of said connection, transmitting information to the mobile communication terminal device of the subscriber as a function of the collected online statistical data;

said method including the following steps:
loading a subscriber profile into a Call Session Control Function (CSCF) containing an OSAS trigger that invokes OSAS functions;
the mobile communication terminal device sending an SIP INVITE message to the CSCF to initiate an SIP INVITE session;
the CSCF forwarding the SIP INVITE message to the OSAS, and the OSAS trigger invoking at least one OSAS function;
the OSAS removing from the forwarded SIP INVITE message online statistical data and adding media to the SIP INVITE message and then sending the SIP INVITE message containing the added media back to the CSCF; and
the CSCF sending to the mobile communication terminal device a provisional response containing the OSAS added media;
wherein the OSAS added media are different (multimedia) media, in the form selected from images, text, music, and videos.

5. The method according to claim 4, wherein trigger points for an invocation of the OSAS are arranged in an IMS subscriber profile that is available in a Home Subscriber Server, HSS.

6. A system for collecting statistical data of IMS or SIP based services in a mobile IP multimedia subsystem including means for the execution of the method according to claim 4.

7. A method for the collecting of statistical data of IMS or Session Initiation Protocol (SIP) based services in a mobile Internet Protocol (IP) based multimedia subsystem, IMS, whereby an evaluation of the service dependent user behavior of communication participants during a connection setup initiated by a mobile communication terminal device of a subscriber is carried out with an application, comprising: providing an Online Statistics and Advertisement Server, OSAS, integrated as a new application server component into IMS session applications and the corresponding signaling traffic; wherein the OSAS has access to all of the relevant SIP signaling and to the signaling data during the session setup and can determine from it online all relevant parameters; the OSAS collecting during connection setup run-time online statistical data for IP based services and, during the establishment of said connection, transmitting information to the mobile communication terminal device of the subscriber as a function of the collected online statistical data; said method including the following steps:

loading a subscriber profile into a Call Session Control Function (CSCF) containing an OSAS trigger that invokes OSAS functions;

the mobile communication terminal device sending an SIP INVITE message to the CSCF to initiate an SIP INVITE session;

the CSCF forwarding the SIP INVITE message to the OSAS, and the OSAS trigger invoking at least one OSAS function;

the OSAS removing from the forwarded SIP INVITE message online statistical data and adding media to the SIP INVITE message and then sending the SIP INVITE message containing the added media back to the CSCF; and the CSCF sending to the mobile communication terminal device a provisional response containing the OSAS added media;

wherein one or a plurality of the trigger points for an invocation of the OSAS are arranged in an IMS subscriber profile that is available in the Home Subscriber Server, HSS.

8. A system for collecting statistical data of IMS or SIP based services in a mobile IP multimedia subsystem including means for the execution of the method according to claim 7.

9. A system for collecting statistical data of IMS or Session Initiation Protocol (SIP) based services in a mobile Internet Protocol (IP) multimedia subsystem, comprising:

a data processing unit in the form of an Online Statistics and Advertisement Server, OSAS;

said data processing unit being integrated as a new application server component into IMS session applications and corresponding signaling traffic and being adapted to collect during connection setup run-time statistical data for IP based services;

wherein the OSAS has access to all of the relevant SIP signaling and to the signaling data during the session setup and can determine from it online all relevant parameters;

said OSAS adapted to evaluate service dependent behavior of communication participants during the connection setup and transmitting information to a mobile communication terminal/device of a subscriber as a function of the statistical data collected during the establishment of said connection;

the system adapted to load a subscriber profile into a Call Session Control Function (CSCF) containing an OSAS trigger that invokes OSAS functions;

the mobile communication terminal device adapted to send an SIP INVITE message to the CSCF to initiate an SIP INVITE session;

the CSCF adapted to forward the SIP INVITE message to the OSAS, and the OSAS trigger invoking at least one OSAS function;

the OSAS adapted to remove from the forwarded SIP INVITE message online statistical data and add media to the SIP INVITE message and then send the SIP INVITE message containing the added media back to the CSCF; and the CSCF adapted to send to the mobile communication terminal device a provisional response containing the OSAS added media.

10. The system according to claim 9, wherein the OSAS is connected to the Call State Control Function, CSCF, of the IMS.

11. The system of claim 9, wherein information is deposited in the terminal device in different (multimedia) media, in the form of images, text, music and videos.

12. The system of claim 9, wherein a plurality of the trigger points for an invocation of the OSAS are arranged in an IMS subscriber profile that is available in the Home Subscriber Server, HSS.

13. The system of claim 9, wherein the relevant parameters comprise one or more of the following variables:

FROM and TO address fields
A Party
B party
used service
used codecs
session duration
information for the billing of relevant inter-operator parameters
all information in the corresponding SIP messages
SIP and SDP parameters.

\* \* \* \* \*